(No Model.) 2 Sheets—Sheet 1.
J. M. ISGRIG.
SHAFT ALIGNING DEVICE.
No. 541,754. Patented June 25, 1895.
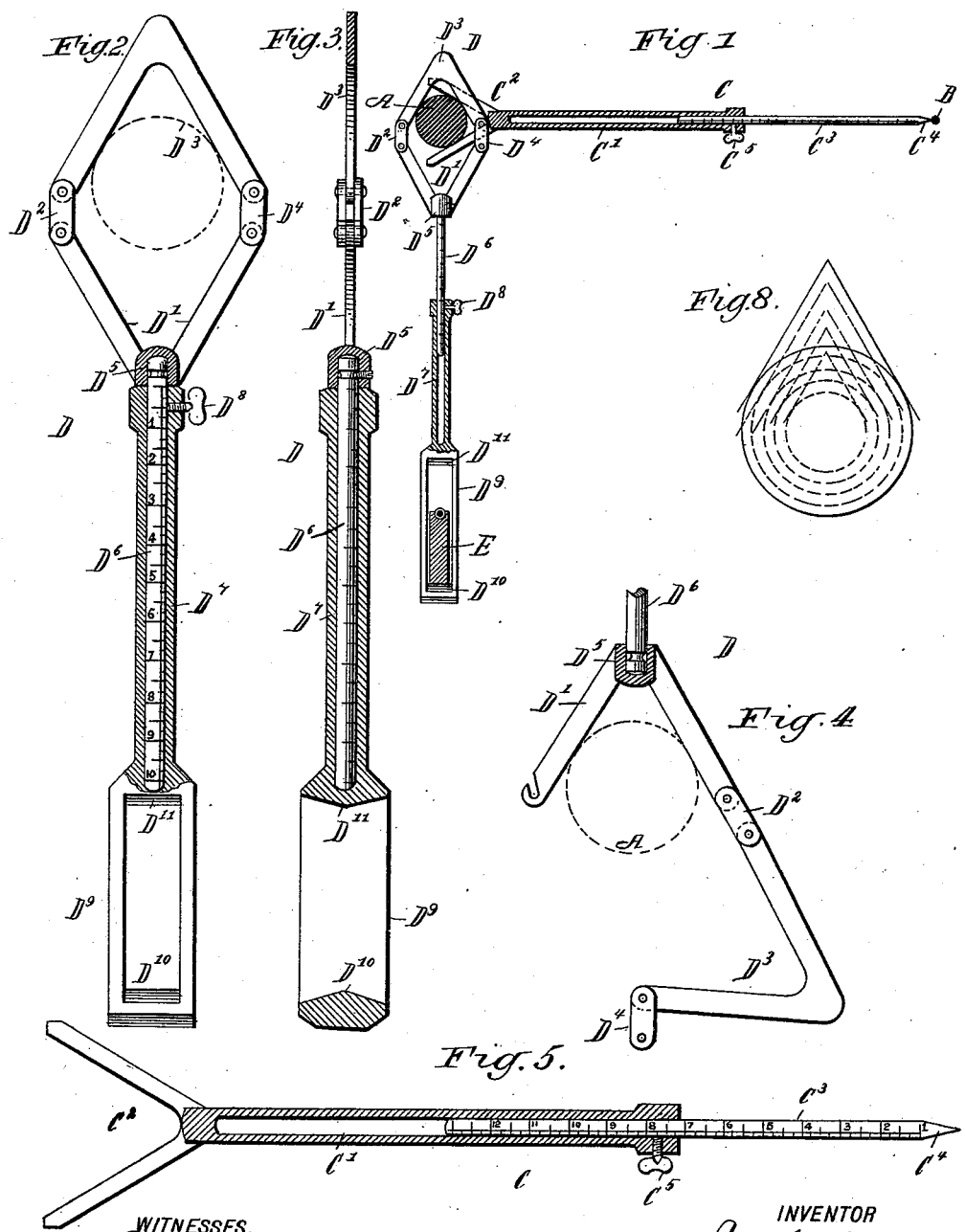

(No Model.) 2 Sheets—Sheet 2.

J. M. ISGRIG.
SHAFT ALIGNING DEVICE.

No. 541,754. Patented June 25, 1895.

WITNESSES:

INVENTOR
J. M. Isgrig
BY
Munn & Co
ATTORNEYS.

UNITED STATES PATENT OFFICE.

JACOB M. ISGRIG, OF TRAVERSE CITY, MICHIGAN.

SHAFT-ALIGNING DEVICE.

SPECIFICATION forming part of Letters Patent No. 541,754, dated June 25, 1895.

Application filed August 14, 1894. Serial No. 520,265. (No model.)

*To all whom it may concern:*

Be it known that I, JACOB MILLROY ISGRIG, of Traverse City, in the county of Grand Traverse and State of Michigan, have invented a new and Improved Shaft-Aligning Device, of which the following is a full, clear, and exact description.

The object of the invention is to provide a new and improved shaft aligning device, especially designed for the use of mechanics and others, to permit the operator to quickly and accurately run a line of shafting irrespective of the different diameters of the individual shafts in the line of pulleys, clutches and other devices held on the shafting.

The invention consists principally of a measuring tool for measuring the distance of shafting from a stretched temporary cord or line, to find discrepancies in a lateral or horizontal direction, and a pair of adjustable hangers adapted to be supported on the shafting and carrying a level to find discrepancies at right angles to the temporary cord and measuring tool.

The invention also consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 6:
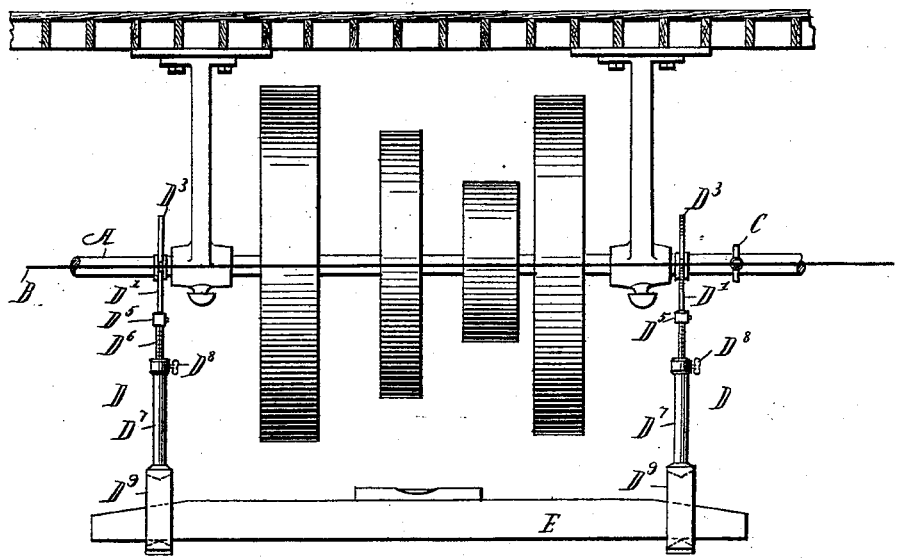
Figure 7:
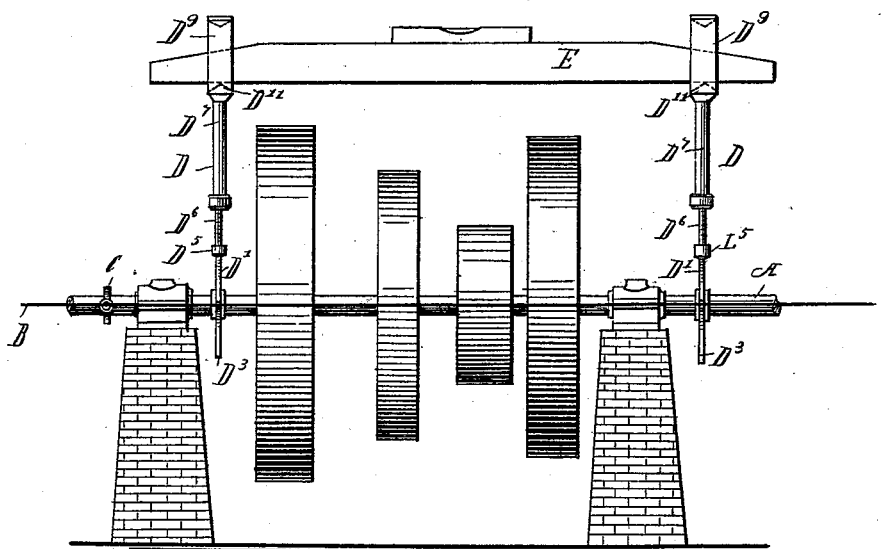

Figure 1 is a cross-section of the improvement as applied. Fig. 2 is an enlarged end elevation, with parts in section, of one of the adjustable hangers. Fig. 3 is a sectional side elevation of the same. Fig. 4 is an enlarged side elevation of the head of one of the hangers with the links in an open position and showing the position of the head when resting on the shaft. Fig. 5 is an enlarged sectional side elevation of the measuring-tool. Fig. 6 is a side elevation of the improvement as applied on the shafting supported from the ceiling. Fig. 7 is a similar view of the same as applied on shafting supported from the floor, and Fig. 8 is a diagrammatic view of different-sized shafts and heads.

In order to get a line of shafting A in perfect alignment, it is necessary to align it in two directions or planes arranged at right angles, one to the other.

The line of shafting to be leveled may be supported from the ceiling, as illustrated in Fig. 6, or from the floor, as shown in Fig. 7; and the said line of shafting may be composed of individual shafts of different diameters.

In the immediate neighborhood of the proposed line of shafting A, and preferably at one side thereof, is stretched a line B in a horizontal direction and in perfect alignment with the engine or power plant, and in order to find any discrepancies in the line of shafting A in a lateral or horizontal direction, I provide a measuring tool C, for measuring distances between the line of shafting A and the said temporary stretched cord B, and in case any discrepancies are found in the distance measured, it indicates that the line of shafting is not in proper alignment with the said temporary cord (or power plant) the operator adjusts the bearings of the shafting A horizontally until the shafting is perfectly parallel with the said cord B. This is readily controlled by the operator applying the measuring tool C, at different points between the shafting and the cord, until both are perfectly parallel.

When the line of shafting A is supported from the ceiling, as illustrated in Figs. 1 and 6, then I employ on the line of shafting, hangers D which hang perfectly perpendicular and at right angles to the cord B. The hangers D are adapted to support a spirit level E, as indicated in Figs. 1 and 6. The operator now adjusts the bearings on the shafting A, until the spirit level E is perfectly horizontal, whereby two sides of the shafting have been made straight, it being understood that one side was made straight by the tool C and cord B, and the other by the hangers D and the spirit level E, as above stated.

When the line of shafting is supported from the floor, as shown in Fig. 7, then the hangers D are set on the line of shafting A, to support the spirit level E above and at right angles to the cord B, as will be readily understood by reference to the said figure.

The measuring tool C is shown in detail in Fig. 5, and consists of a tubular body C' formed at its closed end with arms $C^2$ standing at an angle of sixty degrees and adapted to engage or straddle the individual shaft in the line of shafting A. The tubular body C' has an open end in which is fitted to slide a graduated bar $C^3$ having a graduation of inches and subdivisions and formed at its outer end with a point $C^4$ adapted to indicate or abut on the line B said bar $C^3$ being of such a length relatively to the tubular body C' as to be capable of being almost entirely housed therein.

A set screw $C^5$ in the open end of the tube C' serves to fasten the graduated bar $C^3$ in place after the latter is adjusted to indicate the proper distance from the line of shafting A, to the temporary line B. Each of the hangers D, is of the construction shown in Figs. 2, 3 and 4, and is provided with the bent or forked arms D' standing at an angle of sixty degrees, one being connected by a link $D^2$ with a pair of bent arms $D^3$ likewise standing at an angle of sixty degrees, one to the other, having their apex in an opposite direction to the apex of the arms D'.

The free ends of the set of arms D' and $D^3$ are adapted to be connected with each other by a link $D^4$ fitted on one of the arms and engaged by a pin or slot in the other arm, as illustrated in Figs. 3 and 5. The apex of the arms D' is connected by a swivel $D^5$ with a graduated bar $D^6$ having a graduation in inches and subdivisions similar to the bar $C^3$ of the measuring tool C. This graduated bar $D^6$ is fitted to slide in a tube $D^7$ and adapted to be fastened thereon by a set screw $D^8$; on the closed lower end of the tube $D^7$, is secured or formed an open head $D^9$ formed at the bottom with knife-edges $D^{10}$, and at the top with knife edges $D^{11}$ adapted to support a spirit level E or a straight edge formed with a spirit level, as indicated in Figs. 6 and 7.

It is understood, that the spirit level is supported at its ends in the two heads $D^9$ of the hangers D, as is plainly illustrated in Figs. 6 and 7, it being understood that when the hangers applied, are in a downward position, as shown in Fig. 6, then the spirit level E is supported on the lower knife-edges $D^{10}$, and when the said hangers extend upwardly from the line of shafting, as shown in Fig. 7, the spirit level is supported on the knife-edges $D^{11}$.

The swivel $D^5$ permits the heads of the hangers D to turn readily on the bar $D^6$ thereby enabling the operator to level two shafts at right angles. For instance, if one of the hangers D was placed on one shaft and the other hanger D was placed on another shaft at right angles with each other, then the swivel $D^5$ will allow the heads $D^9$ to swing around so as to engage the ends of the level or straight edge E.

The hangers D can be adjusted to such a length as will permit of supporting the spirit level E, above or below any pulley, coupling or other device that may be on that part of the line of shafting to be leveled. By making the support heads of the hangers D with forked arms D' and $D^3$, as described and shown in Fig. 2, I am enabled to support the hangers in a perfectly plumb line from the shaft; by making the angle of the sets of arms D' and $D^3$ sixty degrees, I am enabled to use the hangers on different sized shafts in the line of shafting, and obtain a correct leveling of the shafting, as the hangers are then adjusted by sliding the bar $D^6$ in the tube $D^7$, a proper distance corresponding to the two different sized shafts, on which the two hangers are supported. For instance, if one hanger D is on a three inch shaft and the other hanger is on the next adjacent shaft of a diameter of two and three-fourths inches, then the hanger on the large shaft must be adjusted so as to be one-fourth of an inch longer, or the hanger on the small shaft adjusted so as to be one-fourth of an inch shorter, to compensate for the difference in the size of the two shafts. This distance is adjusted by moving the bar $D^6$, one-quarter inch out of the tube $D^7$ or one-fourth of an inch into the tube $D^7$ and then again fastening the two parts together by the set screw $D^8$.

It is understood that by making the arms at an angle of sixty degrees, the adjustment of the bars $D^6$, relative to the tubes $D^7$, is equal to the difference in the diameter of the shafts, as illustrated in Fig. 7. The same applies to the measuring tool C, which is adjusted along the line of shafting and the line B on different sized shafts in the line of shafting, by being correspondingly adjusted at its bar $C^3$ in the tube C', whenever the operator passes from the large sized shaft to a small sized shaft, or vice versa in the line of shafting. For instance, if the measuring tool C is adjusted along the line of a three inch shaft and the line B, the joining shaft being two and one-half inches, then the operator adjusts the tool C by lengthening it just one-half inch, or the same as the difference in the diameter of the two shafts.

The heads of the hangers D are adapted to be opened by the links $D^4$, as previously described, so as to permit the operator to conveniently engage the shaft at any desired point. Now, by the arrangement described, the operator is enabled to quickly and accurately adjust the shafts in the line of shafting, so as to bring the latter in proper alignment in a comparatively short time.

Having thus fully described my invention, I claim as new and desire to secure by Letters Patent—

1. A shaft aligning device, provided with hangers each comprising a tube formed with a head adapted to support one end of a straight-edge or level, a graduated bar held adjustable in the said tube, and a head held on the said graduated bar and adapted to engage the line of shafting, the said head comprising two sets of angular arms, pivotally connected with each other and adapted to be fastened together, substantially as shown and described.

2. A shaft aligning device comprising a body, a bar adjustably mounted thereon, and a head adapted to engage the shafting, said head comprising bent arms pivoted together at one end with their other ends adapted to be connected together embracing the shafting, substantially as set forth.

3. A shaft-aligning device comprising a body adapted to support a level, a bar adjustably connected thereto and a head adapted to engage the shafting and having a swiveled connection with the body independent of the connection between the adjustable bar and the body, whereby the body may be turned to receive a level, in different positions substantially as set forth.

4. A shaft aligning device comprising a body having a head having upper and lower oppositely arranged knife edges each adapted to support a level, said body being provided with means for supporting it above the shafting whereby one of said knife edges is brought into operation and being also provided with means for suspending it beneath the line of shafting whereby the other knife edge is brought into operation, substantially as set forth.

5. A shaft aligning device having a head provided with arms projecting at angles to one another, a pair of arms arranged at angles to one another, one of said last named arms being pivoted to one of the arms on the head and the other arm having an eye at its end, and a hook on the end of the other arm on the head adapted to engage said eye, substantially as set forth.

JACOB M. ISGRIG.

Witnesses:
WILLIAM W. SMITH,
OLIVER C. ISGRIG.